(12) United States Patent
Abdulmohsin et al.

(10) Patent No.: US 12,578,500 B2
(45) Date of Patent: Mar. 17, 2026

(54) HYDROCARBON RESERVOIR SATURATION LOGGING

(71) Applicant: Saudi Arabian Oil Company, Dhahran (SA)

(72) Inventors: Mustafa Abdulmohsin, Dhahran (SA); Anas Almarzooq, Dhahran (SA); Shouxiang Mark Ma, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 476 days.

(21) Appl. No.: 17/691,415

(22) Filed: Mar. 10, 2022

(65) Prior Publication Data

US 2023/0288604 A1 Sep. 14, 2023

(51) Int. Cl.
| | |
|---|---|
| *G01V 11/00* | (2006.01) |
| *E21B 49/00* | (2006.01) |
| *G01V 3/02* | (2006.01) |
| *G01V 3/14* | (2006.01) |
| *G01V 5/06* | (2006.01) |

(52) U.S. Cl.
CPC .............. *G01V 11/00* (2013.01); *E21B 49/00* (2013.01); *G01V 3/02* (2013.01); *G01V 3/14* (2013.01); *G01V 5/06* (2013.01)

(58) Field of Classification Search
CPC . G01V 11/00; G01V 3/02; G01V 3/14; G01V 5/06; G01V 3/175; G01V 3/18–34; G01V 5/12–145; E21B 49/00
See application file for complete search history.

(56) References Cited

U.S. PATENT DOCUMENTS

| | | | |
|---|---|---|---|
| 4,413,512 | A | 11/1983 | Zemanek, Jr. |
| 6,008,645 | A | 12/1999 | Bowers et al. |
| 6,484,102 | B1 | 11/2002 | Holmes |
| 6,833,699 | B2 | 12/2004 | Galford et al. |

(Continued)

FOREIGN PATENT DOCUMENTS

| | | |
|---|---|---|
| CN | 111323814 A | 6/2020 |
| CN | 112081565 A | 12/2020 |

(Continued)

OTHER PUBLICATIONS

Sam-Marcus, J., Enaworu, E., Rotimi, O.J. et al. A proposed solution to the determination of water saturation: using a modelled equation. J Petrol Explor Prod Technol 8, 1009-1015 (2018). https://doi.org/10.1007/s13202-018-0453-4 (Year: 2018).*

(Continued)

*Primary Examiner* — Catherine T. Rastovski
*Assistant Examiner* — Brian Butler Geiss
(74) *Attorney, Agent, or Firm* — Bracewell LLP; Constance G. Rhebergen; Brian H. Tompkins

(57) ABSTRACT

Systems and methods for developing a reservoir that include obtaining well log data (conducting nuclear magnetic resonance (NMR), gamma ray (GR), and resistivity logging operations to generate corresponding NMR, GR and formation true resistivity logs for one or more wells in the reservoir), determining rock property data based on the well log data, determining a "water-zone baseline" based on the rock property data (e.g., based on a cross-plot of rock properties determined from the NMR and GR logs and resistivity values), and determining water saturation data based on the water-zone baseline.

14 Claims, 5 Drawing Sheets

(56) References Cited

U.S. PATENT DOCUMENTS

| | | | |
|---|---|---|---|
| 7,755,354 | B2 | 7/2010 | Akkurt |
| 7,804,297 | B2 | 9/2010 | Romero |
| 8,217,337 | B2 | 7/2012 | Neville et al. |
| 8,452,538 | B2 | 5/2013 | Klein et al. |
| 8,645,070 | B2 | 2/2014 | Hanson et al. |
| 8,736,263 | B2 | 5/2014 | Minh |
| 9,588,939 | B2 | 3/2017 | Buiting et al. |
| 9,792,258 | B2 | 10/2017 | Buiting et al. |
| 10,190,999 | B2 | 1/2019 | Hursan et al. |
| 2009/0198446 | A1 | 8/2009 | Hursan |
| 2009/0248309 | A1 | 10/2009 | Neville et al. |
| 2013/0103319 | A1 | 4/2013 | Buiting et al. |
| 2013/0131989 | A1 | 5/2013 | Buiting et al. |
| 2014/0257702 | A1 | 9/2014 | Al-Ibrahim et al. |
| 2015/0198036 | A1 | 7/2015 | Kleinberg et al. |

FOREIGN PATENT DOCUMENTS

| | | |
|---|---|---|
| CN | 108457646 B | 7/2021 |
| CN | 113219531 A | 8/2021 |
| EP | 0835463 B1 | 4/1998 |
| WO | 2014137863 A2 | 9/2014 |

OTHER PUBLICATIONS

Altunbay, M., et al.; "Capillary Pressure Data from NMR Logs and Its Implications on Field Economics" SPE 71703, SPE Annual Technical Conference and Exhibition, New Orleans, Louisiana, Sep. 30-Oct. 1, 2001; pp. 1-10.

Elgaghah, Shedid Ali; "Influence of Stress on the Petrophysical Properties of the Flow Units in Clean and Shaly Heterogeneous Formations" Dissertation Submitted to the University of Oklahoma Graduate College (1997); pp. 1-295.

Glorioso, Juan Carlos, et al.; "Deriving Capillary Pressure and Water Saturation from NMR Transversal Relaxation Times" SPE 81057, SPE Latin American and Caribbean Petroleum Engineering Conference, Trinidad, West Indies, Apr. 27-30, 2003; pp. 1-13.

Hamada, G.M. et al.; "Water Saturation Computation from Laboratory, 3D Regression" Oil & Gas Science and Technology—Rev. IFP, vol. 57 (2002), No. 6; pp. 637-651.

Holis, Z. et al.; "The Petrophysic Role of Low Resistivity Pay Zone of Talang Akar Formation, South Sumatera Basin, Indonesia" SPE-182448-MS, SPE Asia Pacific Oil & Gas Conference and Exhibition, Perth, Australia, Oct. 25-27, 2016; pp. 1-20.

Hou, Junsheng et al.; "Enhanced real-time determination of resistivity anisotropy and dip using multifrequency and multicomponent induction logging" Interpretation / May 2016; pp. SF137-SF149.

International Search Report and Written Opinion for International Application No. PCT/US2017/032059 (SA5499); report mail date Jul. 6, 2017; pp. 1-13.

Jacobsen, S.J. et al.; "Improved Reservoir Evaluation In Norway Wells From High-Resolution Producibility Measurements" SPE 50638, SPE European Conference, The Hague, The Netherlands, Oct. 20-22, 1998; pp. 81-91.

Kantzas, Apostolos et al.; "Chapter 4 Immiscible Displacement Buckley-Leverett Theory" Fundamentals of Fluid Flow in Porous Media: available as of Jan. 6, 2022 at: https://perminc.com/resources/fundamentals-of-fluid-flow-in-porous-media/chapter-4-immiscible-displacement/; pp. 1-13.

Kenyon, W.E. et al.; "A Three-Part Study of NMR Longitudinal Relaxation Properties of Water-Saturated Sandstones" SPE 15643, SPE Formation Evaluation, Sep. 1988; pp. 622-636.

Morris et al.: "Using Log-Derived Values of Water Saturation and Porositz" SPWLA 8th Annual Logging Symposium, Jun. 12, 1967; pp. 1-26.

O'Brien, William J. et al.; "Comprehensive Analysis of the Carbon/Oxygen Log Supri TR-28" United States Department of Energy, Jan. 1983; pp. 1-77.

PetroWiki; "Nuclear magnetic resonance (NMR) logging" available as of Mar. 10, 2022 at http://petrowiki.org/Nuclear_magnetic_resonance_(NMR)_logging; pp. 1-13.

Saha, Souvick; "Low-Resistivity Pay (LRP): Ideas for Solution" SPE 85675, 27th Annual SPE International Technical Conference and Exhibition, Abuja, Nigeria, Aug. 4-6, 2003; pp. 1-8.

"V. General Reservoir Characteristics" available at https://www.princeton.edu/~ota/disk3/1977/7710/771007.PDF, accessed on Feb. 18, 2016; pp. 31-42.

Volokitin, Yakov, et al.; "A Practical Approach to Obtain Primary Drainage Capillary Pressure Curves from NMR Core and Log Data" Petrophysics, vol. 42, No. 4 (Jul.-Aug. 2001); pp. 334-343.

* cited by examiner

400

CONDUCT WELL LOGGING TO GENERATE WELL LOG DATA
402

DETERMINE ROCK PROPERTY DATA BASED ON WELL LOG DATA
404

DETERMINE WATER-ZONE BASELINE BASED ON ROCK PROPERTY DATA
406

DETERMINE WATER SATURATION DATA BASED ON ROCK WATER-ZONE BASELINE
408

DEVELOP RESERVOIR BASED ON WATER SATURATION DATA
410

HYDROCARBON RESERVOIR SATURATION LOGGING

FIELD OF INVENTION

The present invention relates generally to determining characteristics of hydrocarbon reservoirs, and more particularly to hydrocarbon reservoir saturation logs based on rock properties and formation characteristics.

BACKGROUND OF THE INVENTION

A petroleum (or oil and gas) reservoir is a subsurface pool of hydrocarbons trapped in subsurface porous rock formations. Oil and gas wells are drilled into subsurface reservoirs to extract the trapped hydrocarbons. Understanding characteristics of formation rock (or "reservoir characteristics"), including rock surrounding wells, can assist with critical decisions for completing and producing wells. For example, reservoir characteristics can be used to determine whether a formation contains hydrocarbons, to estimate amounts of hydrocarbons in the formation, to determine whether the hydrocarbons can be extracted (or "produced"), and to determine appropriate techniques for drilling wells and producing the hydrocarbons.

Reservoir characteristics of interest often include formation lithology, formation porosity, formation permeability, resistivity, water saturation ($S_w$), free water level (FWL) and the like. Porosity indicates presence of voids in formation rock where oil, gas or water could be trapped. Permeability indicates the ability of liquids and gases to flow through the formation. Resistivity indicates a formation's opposition to the flow of electrical current, which can be indicative of formation porosity and the presence of hydrocarbons in the formation. For example, resistivity may be relatively low for a formation having high porosity and a significant amount of water, and resistivity may be relatively high for a formation having low porosity or containing a significant amount of hydrocarbon. Water saturation indicates the fraction of water in pore space within formation rock. FWL defines a level (or depth) below the lower boundary of hydrocarbons in a reservoir, and at which the capillary pressure between water and oil is zero. A reservoir is expected to contain and produce hydrocarbons or water above the FWL and is expected to contain and produce only water below the FWL.

Reservoir characteristics can be determined using a variety of different techniques. For example, reservoir characteristics are often determined by way of coring operations (e.g., physical extraction and assessment of formation rock and fluid samples) or well logging operations (e.g., wireline logging, logging-while-drilling (LWD) and measurement-while-drilling (MWD)). Coring operations include physically extracting a rock sample from a formation for detailed laboratory analysis. For example, a coring bit may be used during a well drilling operation to cut and retrieve rocks (or "cores") from the formation. The core and fluids contained in the core can be analyzed at the surface (e.g., by way of core analysis in a laboratory) to determine characteristics of the core. Characteristics of one or more cores may be assembled to generate a corresponding "core log" that includes a record of measured core characteristics versus associated in-situ depths of the cores. Although coring and core analysis can be an effective means to determine reservoir characteristics, the extraction and assessment can make it a relatively time consuming and expensive approach.

Logging operations typically include lowering a measurement tool into a wellbore of a well and employing the tool to record measurements of the surrounding formation as the tool traverses the wellbore. The measurements can be assembled and processed to generate a corresponding "well log" that includes a record of reservoir characteristics versus depth. Different types of loggings are known and given types of logging may be selected and employed based on logging conditions and the type of measurements to be acquired. For example, nuclear magnetic resonance (NMR) well logging may be used to characterize pore fluids (e.g., hydrocarbons and water) present in formation rock surrounding a wellbore, which can, in turn, be used to estimate the volume (porosity) and distribution (permeability) of the formation rock pore space. As a further example, resistivity logging may be used to measure electrical resistivity of formation rock surrounding a wellbore, which can, in turn, be used to estimate reservoir saturation with known porosity. Gamma ray (GR) well logging may be used to characterize naturally occurring gamma radiation in formation rock surrounding a wellbore, which can, in turn, be used to determine the lithology of formation rock (e.g., the rock's shale content).

SUMMARY OF THE INVENTION

Determining reservoir characteristics, including water saturation, can be a critical aspect of developing a reservoir. For example, well location and operating parameters, such as well production rates and pressures, are often determined and adjusted to inhibit or delay water breakthrough and minimize water production. Although some logging and log analysis techniques can be useful for determining reservoir characteristics, many rely on data that is not readily available, which can make characterizations impossible, difficult, inaccurate or costly. In some instances, reservoir operators rely on Archie's law to relate in-situ electrical resistivity (R) of a porous rock to its porosity ($\phi$) and water saturation ($S_w$). Archie's law involves the following relationship:

$$S_w^n = \frac{R_w}{R_t} \frac{1}{\phi^m} \tag{1}$$

where $S_w$ is water saturation, $\phi$ is formation porosity, $R_t$ is formation true resistivity, $R_w$ is formation water resistivity which is a function of formation water salinity and formation temperature, m and n are rock electrical properties that serve as the porosity exponent and the saturation exponent.

Formation porosity $\phi$ and true resistivity $R_t$ are typically derived from logging operations that are typically conducted for a drilled well. Formation water salinity and rock electrical properties, m and n, are typically determined from laboratory formation water geochemical analysis and core analysis, and are often unavailable due to limited availability of physical samples of formation water and rock. In these situations, Archie's law may not be practical for reservoir evaluation. Moreover, evaluation of formations with shaly rocks may require using an "augmented" Archie model that relies on rock cation exchange capacity (CEC) to calculate water saturation, which, in turn, requires additional assessments that can further limit use of the Archie's law approach.

Provided are embodiments of developing a reservoir that include an improved technique for determining water saturation characteristics. The described techniques may not require extensive laboratory measurements of formation water and rock properties (such as water salinity, rock electrical properties m and n, or CEC). The described techniques may be particularly useful for determining water saturation ($S_w$) logs (a) in situations where reliable properties of formation water and rock are not available, (b) in situations of shaly formations where conventional non-Archie modeling is not robust, or (c) in situations where porosity logs of density and neutron are not available.

Certain embodiments include the following: (1) obtaining well log data; (2) determining rock property data based on the well log data; (3) determining a "water-zone baseline" based on the rock property data; and (4) determining water saturation data based on the water-zone baseline. In some embodiments, obtaining well log data includes conducting well logging operations to obtain corresponding well log data for use in characterizing the reservoir rock. This may include, for example, conducting nuclear magnetic resonance (NMR), gamma ray (GR), and resistivity (R) logging operations to generate corresponding NMR, GR and resistivity logs for one or more wells in the reservoir.

In some embodiments, the rock property data includes a rock property log, and determining rock property data includes, for each of a plurality of different depths in the reservoir, determining a rock property ($Rock_{GR}$) for the depth according to the following equation:

$$Rock_{GR} = 10\frac{T_{2gm}}{GR} \tag{2}$$

where $T_{2gm}$ is the geometric mean of NMR $T_2$ distribution determined for the depth from the NMR log indicating rock pore structure characteristics, and GR is a GR measurement determined from the GR log that indicates a shale content type of rock matrix mineralogy for the depth. The determined values of the rock property ($Rock_{GR}$) for the different depths may be assembled to generate the rock property log.

In some embodiments, determining a water-zone baseline based on the rock property data includes assessing, based on the rock property log (indicating both rock pore and matrix quality) and the resistivity log (indicating formation saturation), relationships between the rock property and resistivity, where characteristics of the water-zone baseline can be used to define "saturation" parameters for use in determining water saturation ($S_w$) for one or more depths in the reservoir. This may include (a) generating a cross-plot of the resistivity and the rock property ($Rock_{GR}$) values for the different depths, and (b) determining a water-zone baseline corresponding to points where water saturation ($S_w$) is 100% (e.g., $S_w$=1). The water-zone baseline may be defined by an intercept ($A_1$) and a slope ($B_1$) that can be used as saturation parameters.

In some embodiments, determining water saturation data based on the water-zone baseline includes determining water saturation ($S_w$) for one or more depths based on the saturation parameters and respective sets of rock property ($Rock_{GR}$) and resistivity values for the depths. This may include determining, for each depth of the different depths, a formation water saturation ($S_w$) for the depth according to the following equation:

$$S_w = \frac{10^{A1-B1log(Rock_{GR})}}{R_t} \tag{3}$$

where $A_1$ and $B_1$ are the intercept and slope saturation parameters, respectively, $Rock_{GR}$ is the rock property determined for the depth and $R_t$ is formation true resistivity for the depth (e.g., determined from the resistivity log).

True resistivity may be the resistivity measured while the formation rock is not contaminated by drilling fluids, e.g., the deep measurement in a vertical well penetrating a thick formation zone. For example, true resistivity may be a resistivity based on a measurement taken while the rock contains only formation water (e.g., while water saturation ($S_w$)=100%) or only formation water and hydrocarbons (e.g., while Sw<100%). The water saturation ($S_w$) determined for a depth may be limited to a maximum value of 1 and a minimum value of the initial formation connate water saturation ($S_{wi}$) (e.g., if calculated $S_w$>1, then set $S_w$=1, and if calculated $S_w$<$S_{wi}$ then set $S_w$=$S_{wi}$, such that $S_{wi}$≤$S_w$≤1). A water saturation ($S_w$) log (e.g., including a record of determined values of formation water saturation ($S_w$) versus depth) may be generated based on the formation water saturations ($S_w$) determined.

In some instances, the determined formation water saturations can be verified against formation water saturation values determined using other techniques, such as the Archie equation across clean (not shaly) formations. In some embodiments, the reservoir is developed based on the water saturation determination. For example, a well location may be determined based on the water saturation ($S_w$) log, and a well drilling system may be employed by a reservoir operator to drill a well at the well location. Or, for example, a well operating parameter may be determined based on the water saturation ($S_w$) log, and a well system may be operated in accordance with the well operating parameter. The well operating parameter may include, for example, a production rate or pressure drawdown and operating the well system may include controlling the well to operate at the production rate or pressure drawdown.

Provided in some embodiments is a method of determining water saturation ($S_w$) of a hydrocarbon reservoir that includes the following: conducting a nuclear magnetic resonance (NMR) logging operation of a targeted reservoir section of a wellbore extending into a hydrocarbon reservoir to generate a NMR log of the targeted reservoir section, the NMR log comprising NMR $T_2$ measurements for different depths across the targeted reservoir section; conducting a gamma ray (GR) logging operation of the targeted reservoir section to generate a GR log of the targeted reservoir section, the GR log comprising GR measurements for the different depths across the targeted reservoir section; conducting a resistivity logging of the targeted reservoir section to generate a resistivity log of the targeted reservoir section, the resistivity log comprising formation true resistivity ($R_t$) for the different depths across the targeted reservoir section; determining a rock property log comprising a record of rock property ($Rock_{GR}$) for the different depths across the targeted reservoir section, the generating of the rock property log comprising: for each depth of the different depths: determining, based on the NMR log, a $T_2$ distribution for the depth; determining, based on the GR log, a rock matrix mineralogy for the depth; and determining, based on the $T_2$ distribution for the depth and the rock matrix mineralogy for the depth, a rock property ($Rock_{GR}$) for the depth; determining, based on the true resistivity log and the rock property log, a rock property-resistivity cross-plot, the rock property-resistivity cross-plot comprising a cross-plot of rock property ($Rock_{GR}$) and formation true resistivity ($R_t$) for the different depths; determining, based on the rock property-resistivity cross-plot, a water-zone baseline comprising a line fits to areas of the cross-plot corresponding to water saturated (e.g., $S_w$=1) depths, the rock property-resistivity cross-plot defined by an intercept ($A_1$) and a slope ($B_1$); determining, for each depth of the different depths, a formation water saturation ($S_w$) for the depth according to the following equation:

$$S_w = \frac{10^{A1-B1log(Rock_{GR})}}{R_t} \tag{3}$$

and determining, based on the formation water saturations ($S_w$) determined, a water saturation ($S_w$) log for the reservoir.

In some embodiments, the $T_2$ distribution for the depth comprises a geometric mean of NMR $T_2$ distribution for the depth. In certain embodiments, the rock matrix mineralogy for the depth comprises a shale content indicated by a GR measurement for the depth. In some embodiments, the rock property ($Rock_{GR}$) for a depth is determined according to the following equation:

$$Rock_{GR} = 10 \frac{T_2gm}{GR},$$

wherein $T_{2gm}$ is a geometric mean of NMR $T_2$ distribution for the depth and GR is a GR measurement indicating a shale content rock matrix mineralogy for the depth. In certain embodiments, the line fits to areas of the cross-plot indicating water saturation comprises a water-zone baseline corresponding to points where water saturation ($S_w$) is equal to 1. In some embodiments, formation water saturation ($S_w$) determined for a depth is limited to a maximum value of 1 and a minimum value of initial formation connate water saturation ($S_{wi}$). In certain embodiments, the method further comprises developing the reservoir based on the water saturation ($S_w$) log. In some embodiments, developing the reservoir comprises: determining, based on the water saturation ($S_w$) log, a well location; and drilling a well at the well location. In certain embodiments, developing the reservoir comprises: determining, based on the water saturation ($S_w$) log, a well operating parameter; and operating the well in accordance with the well operating parameter. In some embodiments, the well operating parameter comprises a well production rate or well operating pressure.

Provided in some embodiments is a system for determining water saturation ($S_w$) of a hydrocarbon reservoir, comprising: an NMR well logging system configured to conduct a nuclear magnetic resonance (NMR) logging operation of a targeted reservoir section of a wellbore extending into a hydrocarbon reservoir to generate a NMR log of the targeted reservoir section, the NMR log comprising NMR $T_2$ measurements for different depths across the targeted reservoir section; a gamma ray (GR) well logging system configured to conduct a GR logging operation of the targeted reservoir section to generate a GR log of the targeted reservoir section, the GR log comprising GR measurements for the different depths across the targeted reservoir section; a resistivity well logging system configured to conduct a resistivity logging of the targeted reservoir section to generate a resistivity log of the targeted reservoir section, the resistivity log comprising formation true resistivity (Re) for the different depths across the targeted reservoir section; and a control system configured to perform the following operations: determine a rock property log comprising a record of rock property ($Rock_{GR}$) for the different depths across the targeted reservoir section, the generating of the rock property log comprising: for each depth of the different depths: determining, based on the NMR log, a $T_2$ distribution for the depth; determining, based on the GR log, a rock matrix mineralogy for the depth; and determining, based on the $T_2$ distribution for the depth and the rock matrix mineralogy for the depth, a rock property ($Rock_{GR}$) for the depth; determine, based on the resistivity log and the rock property log, a rock property-resistivity cross-plot, the rock property-resistivity cross-plot comprising a cross-plot of rock property ($Rock_{GR}$) and formation true resistivity ($R_t$) for the different depths; determine, based on the rock property-resistivity cross-plot, a water-zone baseline comprising a line fits to areas of the cross-plot corresponding to water saturated depths, the rock property-resistivity cross-plot defined by an intercept ($A_1$) and a slope ($B_1$); determine, for each depth of the different depths, a formation water saturation ($S_w$) for the depth according to the following equation:

$$S_w = \frac{10^{A1-B1log(Rock_{GR})}}{R_t} \tag{3}$$

and determine, based on the formation water saturations ($S_w$) determined, a water saturation ($S_w$) log for the reservoir.

In some embodiments, the $T_2$ distribution for the depth comprises a geometric mean of NMR $T_2$ distribution for the depth. In certain embodiments, the rock matrix mineralogy for the depth comprises a shale content indicated by a GR measurement for the depth. In some embodiments, the rock property ($Rock_{GR}$) for a depth is determined according to the following equation:

$$Rock_{Gr} = 10 \frac{T_2gm}{GR},$$

wherein $T_{2gm}$ is a geometric mean of NMR $T_2$ distribution for the depth and GR is a GR measurement indicating a shale content rock matrix mineralogy for the depth. In certain embodiments, the line fits to areas of the cross-plot indicating water saturation comprises a water-zone baseline corresponding to points where water saturation ($S_w$) is equal to 1. In some embodiments, formation water saturation ($S_w$) determined for a depth is limited to a maximum value of 1 and a minimum value of initial formation connate water saturation ($S_{wi}$). In certain embodiments, the reservoir is developed based on the water saturation ($S_w$) log. In some embodiments, developing the reservoir comprises: determining, based on the water saturation ($S_w$) log, a well location; and drilling a well at the well location. In certain embodiments, developing the reservoir comprises: determining, based on the water saturation ($S_w$) log, a well operating parameter; and operating the well in accordance with the well operating parameter. In some embodiments, the well operating parameter comprises a well production rate or well operating pressure.

Provided in some embodiments is a non-transitory computer-readable storage medium comprising program instructions stored thereon that are executable by a computer processer to perform the following operations for determining water saturation ($S_w$) of a hydrocarbon reservoir: obtaining a nuclear magnetic resonance (NMR) log of the targeted reservoir section, the NMR log comprising NMR $T_2$ measurements for different depths across the targeted reservoir section; obtaining a gamma ray (GR) log of the targeted reservoir section, the GR log comprising GR measurements for the different depths across the targeted reservoir section; obtaining a resistivity log of the targeted reservoir section, the resistivity log comprising formation true resistivity (Re) for the different depths across the targeted reservoir section; determining a rock property log comprising a record of rock property ($\text{Rock}_{GR}$) for the different depths across the targeted reservoir section, the generating of the rock property log comprising: for each depth of the different depths: determining, based on the NMR log, a $T_2$ distribution for the depth; determining, based on the GR log, a rock matrix mineralogy for the depth; and determining, based on the $T_2$ distribution for the depth and the rock matrix mineralogy for the depth, a rock property ($\text{Rock}_{GR}$) for the depth; determining, based on the resistivity log and the rock property log, a rock property-resistivity cross-plot, the rock property-resistivity cross-plot comprising a cross-plot of rock property ($\text{Rock}_{GR}$) and formation true resistivity ($R_t$) for the different depths; determining, based on the rock property-resistivity cross-plot, a water-zone baseline comprising a line fits to areas of the cross-plot corresponding to water saturated depths, the rock property-resistivity cross-plot defined by an intercept ($A_1$) and a slope ($B_1$); determining, for each depth of the different depths, a formation water saturation ($S_w$) for the depth according to the following equation:

$$S_w = \frac{10^{A1 - B1 \, log(Rock_{GR})}}{R_t} \qquad (3)$$

and determining, based on the formation water saturations ($S_w$) determined, a water saturation ($S_w$) log for the reservoir.

Figure 1:
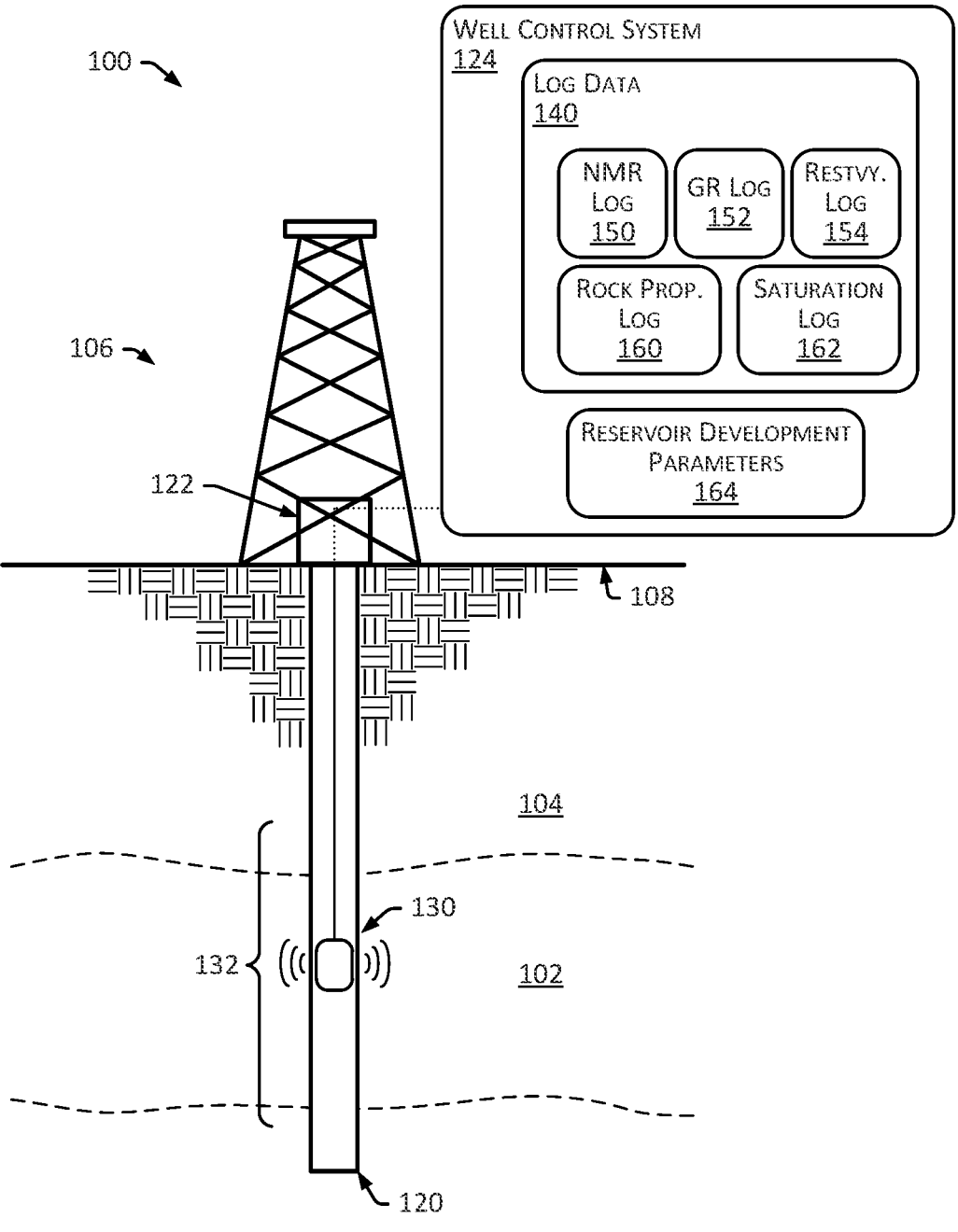
FIG. 1 is a diagram that illustrates a reservoir environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

Described are embodiments of systems and methods for developing a reservoir that employ an improved technique for determining water saturation characteristics. Certain embodiments include the following: (1) obtaining well log data; (2) determining rock property data based on the well log data; (3) determining a "water-zone baseline" based on the rock property data; and (4) determining water saturation data based on the water-zone baseline. In some embodiments, obtaining well log data includes conducting well logging operations to obtain corresponding well log data for use in characterizing the reservoir rock. This may include, for example, conducting nuclear magnetic resonance (NMR), gamma ray (GR), and resistivity logging operations to generate corresponding NMR, GR and resistivity logs for one or more wells in the reservoir.

In some embodiments, the rock property data includes a rock property log, and determining rock property data includes, for each of a plurality of different depths in the reservoir, determining a rock property ($\text{Rock}_{GR}$) for the depth according to the following equation:

$$\text{Rock}_{Gr} = 10 \frac{T_{2gm}}{GR} \qquad (2)$$

where $T_{2gm}$ is the geometric mean of NMR $T_2$ distribution determined for the depth from the NMR log indicating rock pore structure characteristics, and GR is a GR measurement determined from the GR log that indicates a shale content type of rock matrix mineralogy for the depth. The determined values of the rock property ($\text{Rock}_{GR}$) for the different depths may be assembled to generate the rock property log.

In some embodiments, determining a water-zone baseline based on the rock property data includes assessing, based on the rock property log (indicating both rock pore and matrix quality) and the resistivity log (indicating formation saturation), relationships between the rock property and resistivity, where characteristics of the water-zone baseline can be used to define "saturation" parameters for use in determining water saturation ($S_w$) for one or more depths in the reservoir. This may include (a) generating a cross-plot of the resistivity and the rock property ($\text{Rock}_{GR}$) values for the different depths, and (b) determining a water-zone baseline corresponding to points where water saturation ($S_w$) is 100% (e.g., $S_w$=1). The water-zone baseline may be defined by an intercept ($A_1$) and a slope ($B_1$) that can be used as saturation parameters.

In some embodiments, determining water saturation data based on the water-zone baseline includes determining water saturation ($S_w$) for one or more depths based on the saturation parameters and respective sets of rock property ($\text{Rock}_{GR}$) and resistivity values for the depths. This may include determining, for each depth of the different depths, a formation water saturation ($S_w$) for the depth according to the following equation:

$$S_w = \frac{10^{A1 - B1 \, log(Rock_{GR})}}{R_t} \qquad (3)$$

where $A_1$ and $B_1$ are the intercept and slope saturation parameters, respectively, $\text{Rock}_{GR}$ is the rock property determined for the depth and $R_t$ is formation true resistivity for the depth (e.g., determined from the resistivity log).

True resistivity may be the resistivity measured while the formation rock is not contaminated by drilling fluids, e.g., the deep measurement in a vertical well penetrating a thick formation zone. For example, true resistivity may be a resistivity based on a measurement taken while the rock contains only formation water (e.g., while water saturation $(S_w)=100\%$) or only formation water and hydrocarbons (e.g., while $S_w<100\%$). The water saturation $(S_w)$ determined for a depth may be limited to a maximum value of 1 and a minimum value of the initial formation connate water saturation $(S_{wi})$ (e.g., if calculated $S_w>1$, then set $S_w=1$, and if calculated $S_w<S_{wi}$, then set $S_w=S_{wi}$, such that $S_{wi}\leq S_w\leq 1$). A water saturation $(S_w)$ log (e.g., including a record of determined values of formation water saturation $(S_w)$ versus depth) may be generated based on the formation water saturations $(S_w)$ determined.

In some instances, the determined formation water saturations can be verified against formation water saturation values determined using other techniques, such as the Archie equation across clean formations. In some embodiments, the reservoir is developed based on the water saturation determination. For example, a well location may be determined based on the water saturation $(S_w)$ log, and a well drilling system may be employed by a reservoir operator to drill a well at the well location. Or, for example, a well operating parameter may be determined based on the water saturation $(S_w)$ log, and a well system may be operated in accordance with the well operating parameter. The well operating parameter may include, for example, a production rate or pressure drawdown and operating the well system may include controlling the well to operate at the production rate or pressure drawdown.

FIG. 1 is a diagram that illustrates a reservoir environment 100 in accordance with one or more embodiments. In the illustrated embodiment, the reservoir environment 100 includes a reservoir ("reservoir") 102 located in a subsurface formation ("formation") 104, and a well system ("well") 106.

The formation 104 may include a porous or fractured rock formation that resides beneath the earth's surface (or "surface") 108. The reservoir 102 may be a hydrocarbon reservoir defined by a portion of the formation 104 that contains (or that is at least determined or expected to contain) a subsurface pool of hydrocarbons, such as oil and gas. The formation 104 and the reservoir 102 may each include layers of rock having varying characteristics, such as varying degrees of permeability, porosity, and fluid saturation. In the case of the well 106 being operated as a production well, well 106 may be a hydrocarbon production well that is operable to facilitate the extraction of hydrocarbons (or "production"), such as oil or gas, from the reservoir 102. In the case of the well 106 being operated as an injection well, the well 106 may be operable to facilitate the injection of substances, such as water or gas, into the reservoir 102 or other portions of the formation 104.

In the illustrated embodiment, the well 106 includes a wellbore 120, a well logging system (or "logging system") 122 and a well control system ("control system") 124. The wellbore 120 may be a bored hole that extends from the surface 108 into a target zone of the formation 104, such as the reservoir 102. The wellbore 120 may be created, for example, by a drill bit of a drilling system of the well 106 boring through the formation 104. An upper end of the wellbore 120 (e.g., located at or near the surface 108) may be referred to as the "up-hole" end of the wellbore 120. A lower end of the wellbore 120 (e.g., terminating in the formation 104) may be referred to as the "downhole" end of the wellbore 120.

In some embodiments, the logging system 122 includes devices that facilitate logging of characteristics of the wellbore 120 or surrounding formation rock. The logging system 122 may include, for example, one or more wireline, logging-while-drilling (LWD) or measurement-while-drilling (MWD) type logging systems. The logging system 122 may include a sonde 130 that is lowered into the wellbore 120 and that is operated to measure characteristics of wellbore 120 (e.g., including characteristics of the formation rock of surrounding the wellbore 120) as it traverses a depth interval 132 of the wellbore 120. As described, the logging measurements may be processed to generate corresponding well log data 140 (e.g., including well logs).

In some embodiments, the logging system 122 includes a nuclear magnetic resonance (NMR) logging system including an NMR type sonde 130 that acquires NMR measurements that are recorded in a corresponding NMR log 150. For example, the NMR logging system may include an NMR logging tool including an NMR type sonde 130 that is lowered into the wellbore 120 to acquire NMR measurements as it traverses a depth interval (e.g., a targeted reservoir section) 132 of the wellbore 120. The NMR type sonde 130 may include an NMR transceiver (e.g., circuitry that transmits a radio frequency (RF) magnetic field and that receives the spin-echo signal from formation fluids), and the NMR measurements may include measures of the induced magnetic moment of hydrogen nuclei (protons) contained within the fluid-filled pore space of formation rock received by the NMR transceiver. The NMR measurements may include measurements of $T_2$ decay, presented as a distribution of $T_2$ amplitudes versus decay time at each sample depth, typically from about 0.3 milliseconds (ms) to about 3 second (s). In some embodiments, the NMR measurements are processed (e.g., by the well control system 124) to generate a corresponding NMR log 150. The NMR log 150 may include, for example, a plot of $T_2$ response time (e.g., in seconds) versus depth, across the depth interval 132. The $T_2$ response times may be processed, for example, to determine corresponding estimates and logs of total pore volume (the total porosity) for the formation rock. Unlike the conventional formation porosity logs of density and neutron which utilize nuclear sources that are always on, the source used in NMR logging can be turned off, which often referred to as a "source-less" or "source-free" logging.

In some embodiments, the logging system 122 includes a gamma ray (GR) logging system including a GR type sonde 130 that acquires GR measurements that are recorded in a corresponding GR log 152. For example, the GR logging system may include a GR logging tool including a GR type sonde 130 that is lowered into the wellbore 120 to acquire GR measurements as it traverses the depth interval 132 of the wellbore 120. The GR type sonde 130 may include a GR detector (e.g., a scintillometer), and the GR measurements may include corresponding measures of electromagnetic radiation in the form of gamma rays emitted by the surrounding formation rock and detected by the GR detector. The GR measurements may include, for example, measurements of energy (e.g., in megaelectron volts (MeV)) detected by the GR detector. In some embodiments, the GR measurements are processed (e.g., by the well control system 124) to generate a corresponding GR log 152. The GR log 152 may include, for example, a plot of detected energy (e.g., in MeV) versus depth, across the depth interval 132.

In some embodiments, the logging system 122 includes a resistivity logging system including a resistivity type sonde 130 that acquires resistivity measurements that are recorded in a corresponding resistivity log 154. For example, the resistivity logging system may include a resistivity logging tool including a resistivity type sonde 130 that is lowered into the wellbore 120 to acquire resistivity measurements as it traverses the depth interval 132 of the wellbore 120. The resistivity type sonde 130 (e.g., an electrical sonde) may be operated to apply or induce an electrical current in the surrounding formation rock, and the resistivity measurements may include corresponding measures of the electrical resistance of the surrounding formation rock to the electrical current (e.g., in ohm-meters (ohm-m)). In some embodiments, the resistivity measurements are processed (e.g., by the well control system 124) to generate a corresponding resistivity log 154. The resistivity log 154 may include, for example, a plot of electrical resistance (e.g., in ohm-m) versus depth, across the depth interval 132. In some embodiments, the resistivity logging is conducted while the formation rock is not contaminated by drilling fluids, and the measured and logged resistivity is true formation resistivity (Re). In some embodiments, true formation resistivity values and logs are obtained through resistivity modeling and inversion.

In some embodiments, the well control system 124 is operable to control various operations of the well 106, including well drilling, well logging, well assessment, and well production operations. The well control system 124 may include a well system memory and a well system processor that are operable to perform some or all the various processing and control operations of the well control system 124 described here. In some embodiments, the well control system 124 includes a computer system that is the same as or similar to that of computer system 1000 described with regard to at least FIG. 5.

As described, in some embodiments, the well control system 124 is operable to determine water saturation characteristics using the techniques described herein, which can, in turn, be used to make informed decisions regarding development of the reservoir 102. In some embodiments, the well control system 124 is operable to perform some or all of the following: (1) obtain well log data 140 (e.g., including the NMR log 150, the GR log 152 and the resistivity log 154), (2) determine rock property data (e.g., including a rock property log 160) based on the well log data 140, (3) determine a "water-zone baseline" based on the rock property data (e.g., based on the rock property log), and (4) determine water saturation data (e.g., including a water saturation log 162) based on the water-zone baseline. The water saturation data may be used, for example, by the well control system 124 (or another operator of the reservoir 102) as a basis for controlling operations of the well 106 (or other wells in the reservoir 102). For example, the control system 124 (or another operator of the reservoir 102) may determine one or more reservoir development parameters 164 based on the water saturation log 162, and control operation of the well 106 (or other wells in the reservoir 102) in accordance with the reservoir development parameters 164.

In some embodiments, obtaining well log data 140 includes conducting well logging operations to obtain corresponding well log data 140 for use in characterizing the formation rock of the reservoir 102. This may include, for example, conducting nuclear magnetic resonance (NMR) logging operations to generate the NMR log 150 for the well 106 (e.g., including NMR measurements across the depth interval 132), conducting gamma ray (GR) logging operations to generate the GR log 152 for the well 106 (e.g., including GR measurements across the depth interval 132), and conducting resistivity logging operations to generate a corresponding resistivity log 154 for the well 106 (e.g., including resistivity measurements across the depth interval 132).

In some embodiments, determining rock property data includes, for each of a plurality of different depths within the depth interval 132, determining a rock property ($Rock_{GR}$) for the depth according to the following equation:

$$Rock_{Gr} = 10\frac{T_{2gm}}{GR} \qquad (2)$$

where $T_{2gm}$ is an NMR measurement (e.g., the geometric mean of a NMR $T_2$ distribution) determined for the depth from the NMR log 150, and GR is a GR measurement (e.g., an electromagnetic radiation value that indicates a shale content type rock matrix mineralogy for the depth) determined for the depth from the GR log 152. The determined values of the rock property ($Rock_{GR}$) for the different depths may be assembled to generate a rock property log 160 for the depth interval 132. The rock property log 160 may include, for example, a plot of the determined values of the rock property ($Rock_{GR}$) versus depth, across the depth interval 132. In some embodiments, the rock property ($Rock_{GR}$) may be generalized such that geometric mean of NMR T1 distribution ($T_{1gm}$) or other measurements of rock pore structures (e.g., determined by a corresponding rock pore measurement logging) are used in place of $T_{2gm}$, or clay minerology characterizations (e.g., determined by elemental capture spectrometry logging or a similar clay characterizing logging) are used in place of GR. For example, $T_{1gm}$ or other measurements of rock pore structures may be used in equation (2) in place of $T_{2gm}$, and a clay characteristics measurement may be used in equation (2) in place of GR.

In general, for low shale content rock (or "clean" rock), the GR may have relatively low values and thus the rock property ($Rock_{GR}$) may have relatively high values. Conversely, for high shale content rock (or "dirty" or "shalier" rock), the GR has relatively high values and thus the rock property ($Rock_{GR}$) has relatively low values. In general, for rock with larger pore size ("high quality" or "high permeability" rock), the $T_{2gm}$ may have relatively high values and the rock property ($Rock_{GR}$) may have relatively high values. Conversely, for rock with smaller pore size ("low quality" or "low permeability" rock), the $T_{2gm}$ may have relatively low values and the rock property ($Rock_{GR}$) may have relatively low values.

In some embodiments, identifying a water-zone baseline based on the rock property data includes assessing, based on the rock property log 160 and the resistivity log 154, relationships between the rock property ($Rock_{GR}$) and resistivity, where characteristics of the water-zone baseline can be used to define "saturation" parameters for use in determining water saturation ($S_w$) for one or more depths across the depth interval 132. This may include the following: (a) generating a cross-plot of the resistivity and the rock property ($Rock_{GR}$) values for the different depths across the depth interval 132 (or a "rock property-resistivity" cross-plot); and (b) determining, using the cross-plot, a water-zone baseline. The water-zone baseline may correspond to points in the cross-plot where water saturation is 100% (e.g., $S_w=1$), and may be defined by a water-zone baseline intercept ($A_1$) and a water-zone baseline slope ($B_1$). The water-zone baseline intercept ($A_1$) may be an intercept of the water-zone baseline with a line representative of the rock property ($Rock_{GR}$) having a value of 1. For example, the water-zone baseline intercept ($A_1$) may be proportional to the true formation resistivity value on the water-zone baseline, where the rock property ($Rock_{GR}$) has a value of 1 (as illustrated in the cross-plot 200 of FIG. 2).

Figure 2:
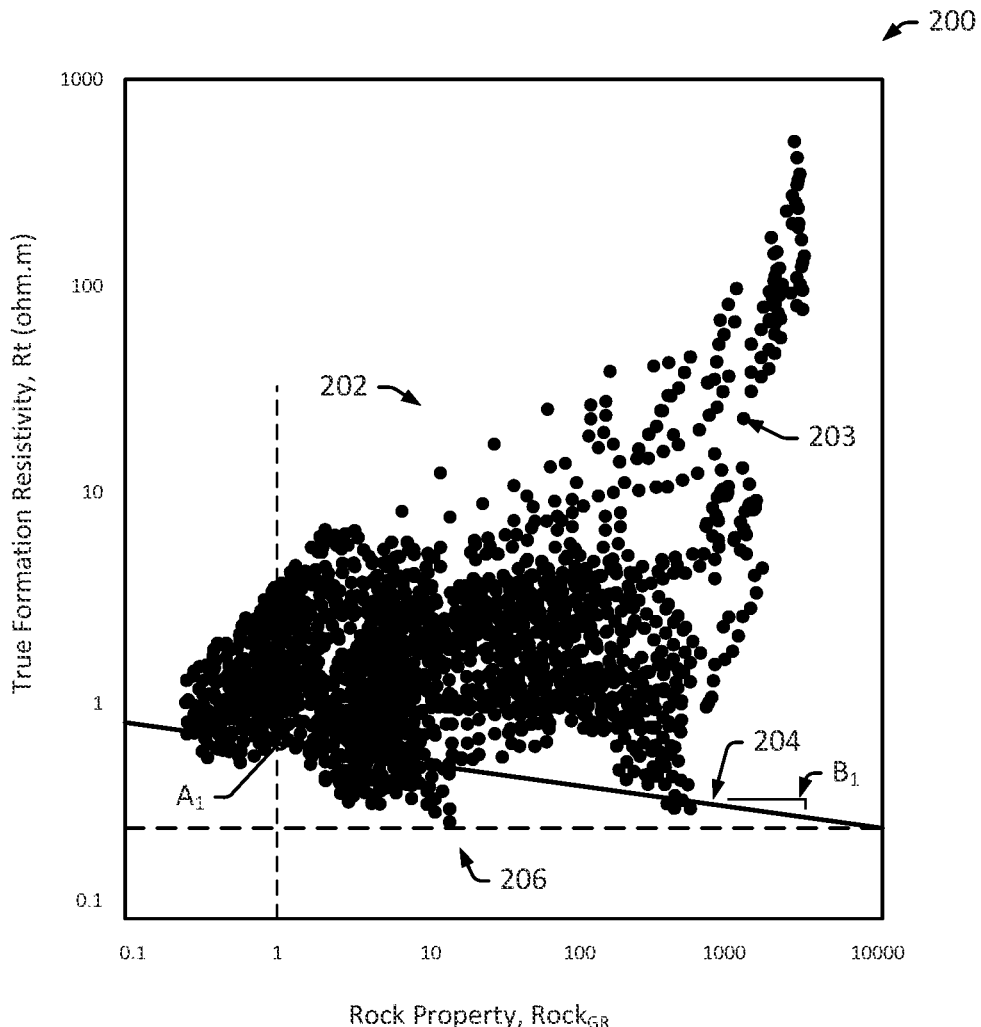
FIG. 2 is a diagram that illustrates a cross-plot of rock property and resistivity values in accordance with one or more embodiments.

FIG. 2 is a diagram that illustrates an example "rock property-resistivity" cross-plot 200 of rock property and resistivity values in accordance with one or more embodiments. The cross-plot 200 includes a set of points 202 plotted on a log-log scale, with each point 203 representing a pair of rock property ($Rock_{GR}$) and true formation resistivity ($R_t$) values for a given depth within a depth interval of interest (e.g., within the depth interval 132). In some embodiment, the water-zone baseline 204 is determined based on an assessment of the set of points 202. For example, the water-zone baseline 204 may be determined by (a) identifying a saturated set of points 206 defined by a sub-set of the set of points 202 that are associated with a depth determined to be water saturated (e.g., a set of points 203 determined to have 100% water saturation, $S_w$=1), and (b) defining a line at the uppermost limit of the saturated set of points 206 (e.g., a line passing through at least two of the saturated set of points 206 such that all of the saturated set of points 206 are on or below the water-zone baseline 204. The water-zone baseline 204 may be defined by a water-zone baseline intercept (e.g., $A_1$=0.1861) and a water-zone baseline slope (e.g., $B_1$=0.0962). In the illustrated embodiment, the water-zone baseline intercept ($A_1$) is at intercept of the water-zone baseline 204 with a line representative of the rock property ($Rock_{GR}$) having a value of 1. For example, in the illustrated embodiment, the water-zone baseline intercept ($A_1$) is the value of logarithmic true formation resistivity on the water-zone baseline 204, where the rock property ($Rock_{GR}$) has a value of 1. The depths determined to be water saturated (e.g., depths determined to have 100% water saturation, $S_w$=1) may be determined based on log-gings and other assessments of the reservoir 102 or the wellbore 120. For example, it may be determined that the formation has 100% water saturation in a depth range of 1,000-1,010 meter (m) based on laboratory core analysis of cores samples extracted from the depth interval of 1,000-1,010 m having 100% water saturation. In some embodiments, the line is determined by a linear fitting to the saturated set of points 206. The water-zone baseline (or "100%" water-zone baseline) and its applications in determining water saturation of hydrocarbon zones may be characterized according to the following equations:

$$\log(R_{t,baseline}) = A_1 - B_1 \log(Rock_{GR}) \quad (4)$$

$$S_w = \frac{R_{t,baseline}}{R_t} \quad (5)$$

$$S_w = \frac{10^{A1-B1\,log(Rock_{GR})}}{R_t} \quad (3)$$

and where $R_{t,baseline}$ is the resistivity value along the water-zone baseline for the given rock property ($Rock_{GR}$) value. In water zones where saturation is 100%, such that water saturation ($S_w$) is equal to 1, the following equation applies:

$$1 = \frac{10^{A1-B1\,log(Rock_{GR})}}{R_{t,baseline}} \quad (6)$$

In some embodiments, saturation parameters (for use in determining water saturation at various depths) are determined based on characteristics of the water-zone baseline. For example, saturation parameters may include an intercept saturation parameter defined by the intercept of the line ($A_1$), and a slope saturation parameter defined by the slope of the line ($B_1$).

In some embodiments, determining water saturation data based on the water-zone baseline includes determining water saturation ($S_w$) for one or more depths based on the saturation parameters and respective sets of values of rock property ($Rock_{GR}$) and resistivity (e.g., respective points 203) for the depth. This may include determining, for each depth of the different depths, a formation water saturation ($S_w$) for the depth according to the following equation:

$$S_w = \frac{10^{A1-B1\,log(Rock_{GR})}}{R_t} \quad (3)$$

where $A_1$ and $B_1$ are the intercept and slope saturation parameters, respectively, $Rock_{GR}$ is the rock property determined for the depth and $R_t$ is formation true resistivity determined for the depth (e.g., determined from the resistivity log 154). In some embodiments, the water saturation ($S_w$) determined for a depth is limited to a maximum value of 1 and a minimum value of the initial formation connate water saturation ($S_{wi}$). For example, if it is calculated that $S_w$>1, then set $S_w$=1, and if it is calculated that $S_w$<$S_{wi}$ then set $S_w$=$S_{wi}$, such that $S_{wi}{\leq}S_w{\leq}1$. In some embodiments, a water saturation ($S_w$) log 162 is generated based on the formation water saturations ($S_w$) determined. The water saturation ($S_w$) log 162 may include a record of determined values of formation water saturation ($S_w$) versus depth, across the depth interval 132.

Figures 3A, 3B, 3C:
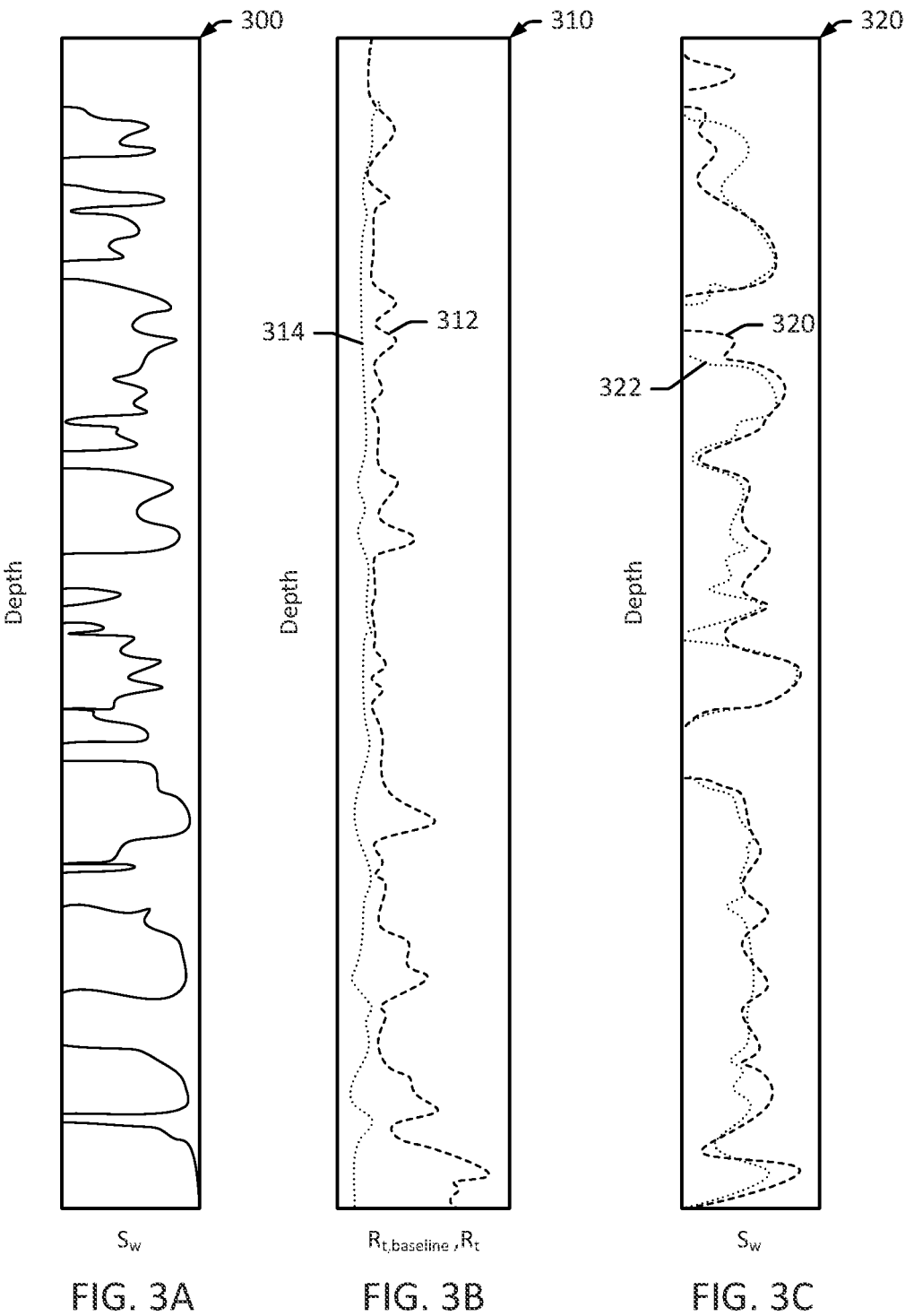
FIG. 3A is a diagram that illustrates a saturation log in accordance with one or more embodiments.
FIG. 3B is a diagram that illustrates resistivity logs in accordance with one or more embodiments.
FIG. 3C is a diagram that illustrates saturation logs in accordance with one or more embodiments.

FIG. 3A is a diagram that illustrates an example saturation log 162 in accordance with one or more embodiments. The saturation log 162 includes a plot of values of water saturation ($S_w$) (e.g., determined using equation (3)) versus depth, across a depth interval (e.g., across the depth interval 132). FIG. 3B is a diagram that illustrates example log track 310 including an overlay of estimated resistivity baseline values ($R_{t,baseline}$) and measured resistivity values ($R_t$). The log track 310 includes a true formation resistivity log 312 (dashed line) including a plot of true formation resistivity values versus depth across a depth interval (e.g., across the depth interval 132). The true formation resistivity values of the true resistivity log 312 may include measured resistivity values ($R_t$) determined from the resistivity log 154 generated by way of a resistivity logging operation. The log track 310 also includes a "baseline" formation resistivity log 314 (dotted line) including a plot of estimated formation resistivity values versus depth across the depth interval (e.g., across the depth interval 132). The estimated formation resistivity values of the baseline resistivity log 314 may include baseline resistivity values ($R_{t,baseline}$) for the different depths calculated using the relationship of equation (4) and respective values of the rock property ($Rock_{GR}$) determined for the different depths using equation 2. For example, the estimated baseline resistivity values ($R_{t,baseline}$) may be determined by applying values of the rock property ($Rock_{GR}$) for the different depths to the following equation:

$$R_{t,baseline}=10^{A1-B1log(Rock_{GR})} \quad (7)$$

The log track 310 illustrates example differences between the estimated resistivity values ($R_{t,baseline}$) and measured log resistivity values ($R_t$) for different depths. For each depth, the ratio between $R_{t,baseline}$ and the resistivity ($R_t$), at the $Rock_{GR}$ for the depth, may be used to calculate water saturation at the depth, for example, using equations (5) and (3), reproduced below:

$$S_w = \frac{R_{t,baseline}}{R_t} \qquad (5)$$

$$S_w = \frac{10^{A1-B1\,log(Rock_{GR})}}{R_t} \qquad (3)$$

In some embodiments, the determined formation water saturations are verified against formation water saturation values determined using other techniques, such as the Archie equation employed across clean formations. For comparison, a first ("rock-property") water saturation ($S_w$) log 162 may be generated using equation (5) and second ("traditional" or "Archie") water saturation ($S_w$) log 162 may be generated using equation (1), and the first and second logs may be compared to confirm whether the two logs are similar. FIG. 3C (in another depth interval different from that of FIG. 3A or FIG. 3B) is a diagram that illustrates overlay of a rock-property water saturation log 320 (e.g., dashed line determined using equation (5)) and a traditional water saturation log 322 (e.g., dotted line determined using the Archie equation). In some instances, this is type of comparison/verification is conducted where the depth interval is determined to contain a relatively low amount of clay (e.g., less than 5% and considered clean), which is an instance where the Archie equations is considered to be most accurate.

In some embodiments, the reservoir 102 is developed based on the water saturation determination. This may include determining reservoir development parameters 164 (e.g., well locations, production rates, production pressures (e.g., production bottom hole pressure), or the like) based on the rock-property water saturation log 162 (e.g., log 300) and developing the reservoir in accordance with the parameters 164. For example, a location for a well in the reservoir 102 may be determined based on the water saturation log 162, and the control system 124 (or another operator of the reservoir 102) may control a drilling system to drill a well into the reservoir 102 at the location. As a further example, a well operating parameter for a well in the reservoir 102 may be determined based on the water saturation log 162, and the control system 124 (or another operator of the reservoir 102) may control the well system (e.g., well system 106) to operate in accordance with the parameter. For example, the well operating parameter may include a production rate, and the control system 124 (or another operator of the reservoir 102) may control a production system of the well 106 (or of another well in the reservoir 102) to operate at the production rate. As another example, the well operating parameter may include a production bottom hole pressure or pressure drawdown, and the control system 124 (or another operator of the reservoir 102) may control the production system of the well 106 (or of another well in the reservoir 102) to operate at the production pressure.

Figure 4:
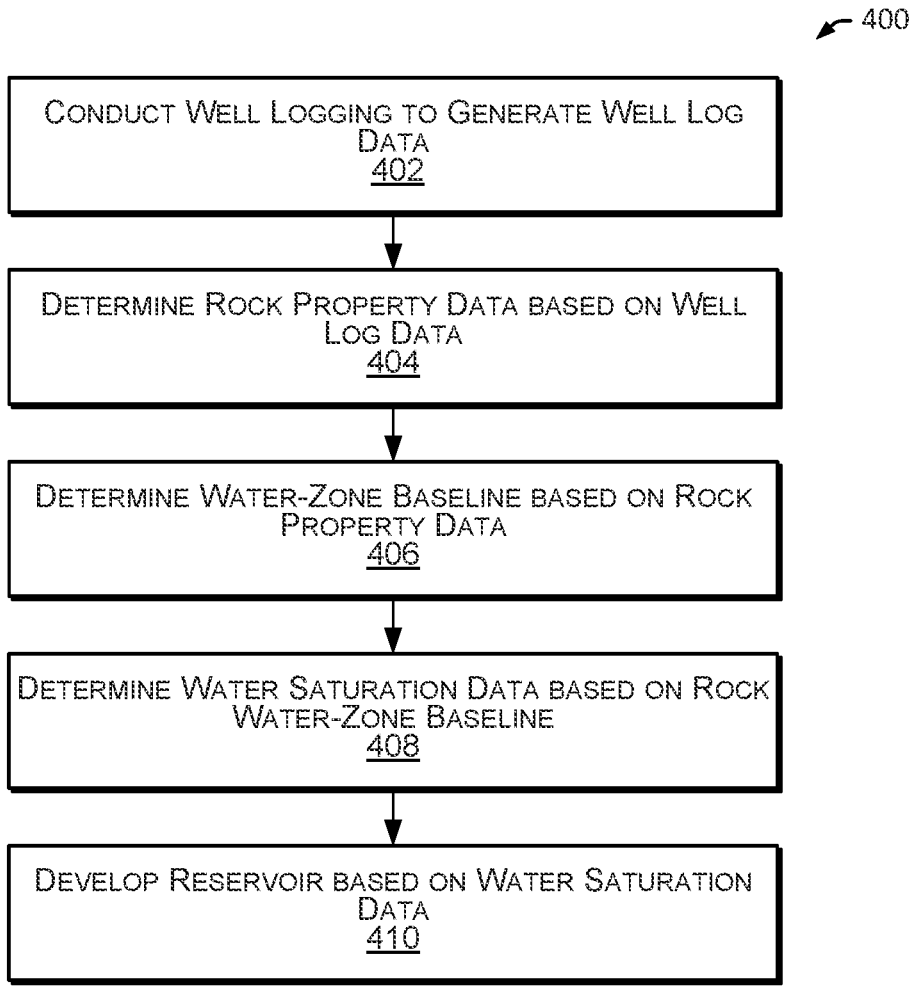
FIG. 4 is a flowchart diagram that illustrates a method for developing a reservoir in accordance with one or more embodiments.

FIG. 4 is a flowchart that illustrates a method 400 for determining water saturation logs and developing a reservoir in accordance with one or more embodiments. In some embodiments, some or all of the method operations are performed by the control system 124 (or another operator of the reservoir 102).

In some embodiments, method 400 includes conducting well logging to generate well log data (block 402). This may include, for a well in a reservoir, conducting an NMR logging operation to generate an NMR log for the well, conducting GR logging to generate a GR log for the well and conducting resistivity logging to generate a resistivity log for the well. For example, conducting well logging to generate well log data 140 may include the control system 124 (or another operator of the reservoir 102) controlling the logging system 122 to conduct NMR, GR and resistivity logging operations in the wellbore 120, to generate an NMR log 150, a GR log 152 and a resistivity log 154 for the well 106.

In some embodiments, method 400 includes determining rock property data based on well log data (block 404). This may include, determining rock properties ($Rock_{GR}$) across a depth interval based on the NMR and GR logs (e.g., using equation (2)). For example, determining rock property data based on well log data may include the control system 124 (or another operator of the reservoir 102) determining, for each of a plurality of different depths within the depth interval 132, a rock property ($Rock_{GR}$) for the depth by applying the respective NMR and GR values of the NMR log 150 and GR log 152 associated with the depth to equation (2), as described here.

In some embodiments, method 400 includes determining a water-zone baseline based on rock property data (block 406). This may include, determining a water-zone baseline and its associated characteristics (e.g., intercept and slope) based on a cross-plot of respective pairs of the determined values of the rock property ($Rock_{GR}$) and true resistivity values (Re) for different depths across the depth interval. For example, determining a water-zone baseline based on rock property data may include the control system 124 (or another operator of the reservoir 102) determining the rock property-resistivity cross-plot 200 that includes a set of points 202 plotted on a log-log scale, with each point 203 representing a pair of rock property ($Rock_{GR}$) and true formation resistivity (Re) values for a given depth within the depth interval 132, and based on the cross-plot 200, determining a water-zone baseline 204 associated with a "saturated" set of points 206 (e.g., points 203 determined to have 100% water saturation, $S_w$=1) and an associated water-zone baseline intercept (e.g., $A_1$=0.1861) and an associated water-zone baseline slope (e.g., $B_1$=0.0962) using the relationships of equation (3), (4), (5) or (6), as described here.

In some embodiments, method 400 includes determining water saturation data based on a water-zone baseline (block 408). This may include, determining formation water saturation ($S_w$) values for different depths across a depth interval based on the water-zone baseline and its associated characteristics (e.g., intercept and slope). For example, determining water saturation data based on a water-zone baseline may include the control system 124 (or another operator of the reservoir 102) determining, for each depth of the different depths within the depth interval 132, a formation water saturation ($S_w$) for the depth according to equation (3) (e.g., with the water saturation ($S_w$) values being limited to a maximum value of 1 and a minimum value of the initial formation connate water saturation ($S_{wi}$)), and determining a water saturation ($S_w$) log 162 (e.g., the log 300 of FIG. 3A) based on the formation water saturations ($S_w$) determined. In some embodiments, the determined formation water saturations are verified against formation water saturation values determined using other techniques, such as Archie equation across clean formations, as described here.

In some embodiments, method 400 includes developing a reservoir based on water saturation data (block 410). This may include conducting reservoir development operations based on an assessment of the formation water saturations ($S_w$) determined. For example, developing a reservoir based on water saturation data may include the control system 124 (or another operator of the reservoir 102) determining reservoir development parameters 164 based on the water saturation ($S_w$) log 162 (e.g., log 300) determined using the "water-zone baseline" approach described here, and controlling operations wells in the reservoir 102 based on the parameters 164. For example, a location for a well in the reservoir 102 may be determined based on the water saturation ($S_w$) log 162, and the control system 124 (or another operator of the reservoir 102) may control a drilling system to drill a well into the reservoir 102 at the location. As a further example, a well operating parameter for a well in the reservoir 102 may be determined based on the water saturation ($S_w$) log 162, and the control system 124 (or another operator of the reservoir 102) may control the well system (e.g., well system 106) to operate in accordance with the parameter. The well operating parameter may include, for example, a production rate, and the control system 124 (or another operator of the reservoir 102) may control a production system of the well 106 (or of another well in the reservoir 102) to operate at the production rate. As another example, the well operating parameter may include a production pressure, and well control system 124 (or another operator of the reservoir 102) may control the production system of the well 106 (or of another well in the reservoir 102) to operate at the production pressure.

Accordingly, the described embodiments of developing a reservoir include an improved technique for determining water saturation characteristics, which can, in turn, be used to guide development of the reservoir. The described embodiments may not require extensive laboratory measurements of formation water and rock properties (such as water salinity, rock electrical properties m and n, or CEC), and may be particularly useful for determining logs of water saturation ($S_w$) for a reservoir, for example, (a) in situations where reliable properties of formation water and rock are not available, (b) in situations of shaly formations where conventional non-Archie modeling is not robust, or (c) in situations where porosity logs of density and neutron are not available.

Figure 5:
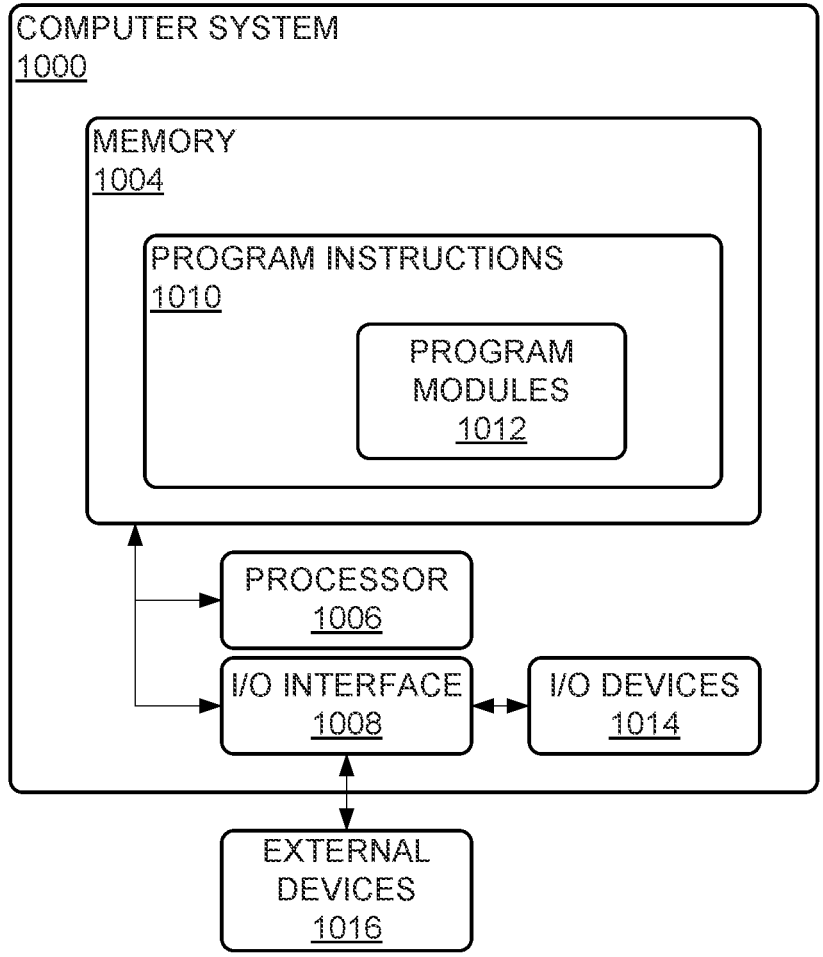
FIG. 5 is a diagram that illustrates an example computer system in accordance with one or more embodiments.

FIG. 5 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random-access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., by the processor 1006) to cause the functional operations described, such as those described with regard to the control system 124 (or another operator), or the method 400.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. The external devices 1016 may include, for example, devices of the well system 106, including logging and production devices.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of determining water saturation ($S_w$) of a hydrocarbon reservoir, the method comprising:

drilling a first well through a formation to form a wellbore in a targeted reservoir section of the hydrocarbon reservoir;

conducting a nuclear magnetic resonance (NMR) logging operation of the targeted reservoir section of the wellbore extending into the hydrocarbon reservoir to generate a nuclear magnetic resonance (NMR) log of the targeted reservoir section, the NMR log comprising NMR $T_2$ measurements for different depths across the targeted reservoir section;

conducting a gamma ray (GR) logging operation of the targeted reservoir section to generate a gamma ray (GR) log of the targeted reservoir section, the GR log comprising GR measurements for the different depths across the targeted reservoir section;

conducting a resistivity logging of the targeted reservoir section to generate a resistivity log of the targeted reservoir section, the resistivity log comprising formation true resistivity ($R_t$) for the different depths across the targeted reservoir section;

determining a rock property log without laboratory measurements of formation water and rock properties, the rock property log comprising a record of rock property ($Rock_{GR}$) for the different depths across the targeted reservoir section, the generating of the rock property log comprising:

for each depth of the different depths:

determining, based on the NMR log, a $T_2$ distribution for the depth;

determining, based on the GR log, a rock matrix mineralogy for the depth; and determining, based on the $T_2$ distribution for the depth and the rock matrix mineralogy for the depth, a rock property ($Rock_{GR}$) for the depth;

determining, based on the resistivity log and the rock property log, a rock property-resistivity cross-plot, the rock property-resistivity cross-plot comprising a cross-plot of rock property ($Rock_{GR}$) and formation true resistivity ($R_t$) for the different depths;

determining, based on the rock property-resistivity cross-plot, a water-zone baseline comprising a line-fit to areas of the cross-plot corresponding to water saturated depths, the rock property-resistivity cross-plot defined by an intercept ($A_1$) and a slope ($B_1$);

determining, for each depth of the different depths, a formation water saturation ($S_w$) for the depth according to the following equation:

$$S_w = \frac{10^{A1-B1\,log(Rock_{GR})}}{R_t}$$

determining, based on the formation water saturations ($S_w$) determined, a water saturation ($S_w$) log for the reservoir, the water saturation ($S_w$) log comprising formation water saturations ($S_w$) vs depth; and developing the reservoir based on the determined water saturation ($S_w$) log and without a density log and a neutron log, wherein developing the reservoir comprises:

determining, based on the water saturation ($S_w$) log, a well location in the formation, the well location comprising a depth to minimize water production; and drilling a second well at the well location to form a second wellbore accessing the hydrocarbon reservoir.

2. The method of claim 1, wherein the $T_2$ distribution for the depth comprises a geometric mean of NMR $T_2$ distribution for the depth.

3. The method of claim 1, wherein the rock matrix mineralogy for the depth comprises a shale content indicated by a GR measurement for the depth.

4. The method of claim 1, wherein the rock property ($Rock_{GR}$) for a depth is determined according to the following equation:

$$Rock_{Gr} = 10\frac{T_{2gm}}{GR},$$

wherein $T_{2gm}$ is a geometric mean of NMR $T_2$ distribution for the depth and GR is a GR measurement indicating a shale content rock matrix mineralogy for the depth.

5. The method of claim 1, wherein the line fit to areas of the cross-plot indicating water saturation comprises a water-zone baseline corresponding to points where water saturation ($S_w$) is equal to 1.

6. The method of claim 1, wherein formation water saturation ($S_w$) determined for a depth is limited to a maximum value of 1 and a minimum value of initial formation connate water saturation ($S_{wi}$).

7. A system for determining water saturation ($S_w$) of a hydrocarbon reservoir, the system comprising:

a well system configured to drill a first well through a formation to form a wellbore in a targeted reservoir section of the hydrocarbon reservoir;

an NMR well logging system configured to conduct a nuclear magnetic resonance (NMR) logging operation of the targeted reservoir section of the wellbore extending into the hydrocarbon reservoir to generate a nuclear magnetic resonance (NMR) log of the targeted reservoir section, the NMR log comprising NMR $T_2$ measurements for different depths across the targeted reservoir section;

a gamma ray (GR) well logging system configured to conduct a gamma ray (GR) logging operation of the targeted reservoir section to generate a gamma ray (GR) log of the targeted reservoir section, the GR log comprising GR measurements for the different depths across the targeted reservoir section;

a resistivity well logging system configured to conduct a resistivity logging of the targeted reservoir section to generate a resistivity log of the targeted reservoir section, the resistivity log comprising formation true resistivity ($R_t$) for the different depths across the targeted reservoir section; and a control system configured to perform the following operations:

determine a rock property log without laboratory measurements of formation water and rock properties, the rock property log comprising a record of rock property ($Rock_{GR}$) for the different depths across the targeted reservoir section, the generating of the rock property log comprising:

for each depth of the different depths:

determining, based on the NMR log, a $T_2$ distribution for the depth;

determining, based on the GR log, a rock matrix mineralogy for the depth; and determining, based on the $T_2$ distribution for the depth and the rock matrix mineralogy for the depth, a rock property ($Rock_{GR}$) for the depth;

determine, based on the resistivity log and the rock property log, a rock property-resistivity cross-plot, the rock property-resistivity cross-plot comprising a cross-plot of rock property ($Rock_{GR}$) and formation true resistivity ($R_t$) for the different depths;

determine, based on the rock property-resistivity cross-plot, a water-zone baseline comprising a line fit to areas of the cross-plot corresponding to water saturated depths, the rock property-resistivity cross-plot defined by an intercept ($A_1$) and a slope ($B_1$);

determine, for each depth of the different depths, a formation water saturation ($S_w$) for the depth according to the following equation:

$$S_w = \frac{10^{A1-B1\,log(Rock_{GR})}}{R_t}$$

determine, based on the formation water saturations ($S_w$) determined, a water saturation ($S_w$) log for the reservoir, the water saturation ($S_w$) log comprising formation water saturations ($S_w$) vs depth; and developing the reservoir based on the determined water saturation ($S_w$) log and without a density log and a neutron log, wherein developing the reservoir comprises:

determining, based on the water saturation ($S_w$) log, a well location in the formation, the well location comprising a depth to minimize water production; and drilling a second well at the well location to form a second wellbore accessing the hydrocarbon reservoir.

8. The system of claim 7, wherein the $T_2$ distribution for the depth comprises a geometric mean of NMR $T_2$ distribution for the depth.

9. The system of claim 7, wherein the rock matrix mineralogy for the depth comprises a shale content indicated by a GR measurement for the depth.

10. The system of claim 7, wherein the rock property ($Rock_{GR}$) for a depth is determined according to the following equation:

$$Rock_{Gr} = 10\frac{T_{2gm}}{GR},$$

wherein $T_{2gm}$ is a geometric mean of NMR $T_2$ distribution for the depth and GR is a GR measurement indicating a shale content rock matrix mineralogy for the depth.

11. The system of claim 7, wherein the line fit to areas of the cross-plot indicating water saturation comprises a water-zone baseline corresponding to points where water saturation ($S_w$) is equal to 1.

12. The system of claim 7, wherein formation water saturation ($S_w$) determined for a depth is limited to a maximum value of 1 and a minimum value of initial formation connate water saturation ($S_{wi}$).

13. A non-transitory computer-readable storage medium comprising program instructions stored thereon that are executable by a computer processer to perform the following operations for determining water saturation ($S_w$) of a hydrocarbon reservoir:

drilling a first well through a formation to form a wellbore in a targeted reservoir section of the hydrocarbon reservoir obtaining a nuclear magnetic resonance (NMR) log of the targeted reservoir section, the NMR log comprising NMR $T_2$ measurements for different depths across the targeted reservoir section;

obtaining a gamma ray (GR) log of the targeted reservoir section, the GR log comprising GR measurements for the different depths across the targeted reservoir section;

obtaining a resistivity log of the targeted reservoir section, the resistivity log comprising formation true resistivity ($R_t$) for the different depths across the targeted reservoir section;

determining a rock property log without laboratory measurements of formation water and rock properties, the rock property log comprising a record of rock property ($Rock_{GR}$) for the different depths across the targeted reservoir section, the generating of the rock property log comprising:

for each depth of the different depths:

determining, based on the NMR log, a $T_2$ distribution for the depth;

determining, based on the GR log, a rock matrix mineralogy for the depth; and determining, based on the $T_2$ distribution for the depth and the rock matrix mineralogy for the depth, a rock property ($Rock_{GR}$) for the depth;

determining, based on the resistivity log and the rock property log, a rock property-resistivity cross-plot, the rock property-resistivity cross-plot comprising a cross-plot of rock property ($Rock_{GR}$) and formation true resistivity ($R_t$) for the different depths;

determining, based on the rock property-resistivity cross-plot, a water-zone baseline comprising a line fit to areas of the cross-plot corresponding to water saturated depths, the rock property-resistivity cross-plot defined by an intercept ($A_1$) and a slope ($B_1$);

determining, for each depth of the different depths, a formation water saturation ($S_w$) for the depth according to the following equation:

$$S_w = \frac{10^{A1-B1\,log(Rock_{GR})}}{R_t}$$

determining, based on the formation water saturations ($S_w$) determined, a water saturation ($S_w$) log for the reservoir, the water saturation ($S_w$) log comprising formation water saturations ($S_w$) vs depth; and developing the reservoir based on the water saturation ($S_w$) log, wherein developing the reservoir comprises:

determining, based on the water saturation ($S_w$) log, a well location in the formation, the well location comprising a depth to minimize water production; and drilling a second well at the well location to form a second wellbore accessing the hydrocarbon reservoir.

14. A method of determining water saturation ($S_w$) of a hydrocarbon reservoir, the method comprising:

drilling a first well through a formation to form a wellbore in a targeted reservoir section of the hydrocarbon reservoir;

conducting a rock pore logging operation of the targeted reservoir section of the wellbore extending into the hydrocarbon reservoir to generate a rock pore log of the targeted reservoir section, the rock pore log comprising rock pore structures measurements for different depths across the targeted reservoir section;

conducting a clay logging operation of the targeted reservoir section to generate a clay log of the targeted reservoir section, the clay log comprising clay characterizing measurements for the different depths across the targeted reservoir section;

conducting a resistivity logging of the targeted reservoir section to generate a resistivity log of the targeted reservoir section, the resistivity log comprising formation true resistivity ($R_t$) for the different depths across the targeted reservoir section;

determining a rock property log without laboratory measurements of formation water and rock properties, the rock property log comprising a record of rock property ($Rock_{GR}$) for the different depths across the targeted reservoir section, the generating of the rock property log comprising:

for each depth of the different depths:

determining, based on the rock pore logging, a rock pore characteristic value for the depth;

determining, based on the clay log, a clay characteristic value for the depth; and determining, based on the rock pore characteristic value for the depth and the clay characteristic value for the depth, a rock property ($Rock_{GR}$) for the depth;

determining, based on the resistivity log and the rock property log, a rock property-resistivity cross-plot, the rock property-resistivity cross-plot comprising a cross-plot of rock property ($Rock_{GR}$) and formation true resistivity ($R_t$) for the different depths;

determining, based on the rock property-resistivity cross-plot, a water-zone baseline comprising a line fit to areas of the cross-plot corresponding to water saturated depths, the rock property-resistivity cross-plot defined by an intercept ($A_1$) and a slope ($B_1$);

determining, for each depth of the different depths, a formation water saturation ($S_w$) for the depth according to the following equation:

$$S_w = \frac{10^{A1-B1\,log(Rock_{GR})}}{R_t}$$

determining, based on the formation water saturations ($S_w$) determined, a water saturation ($S_w$) log for the reservoir, the water saturation ($S_w$) log comprising formation water saturations ($S_w$) vs depth; and developing the reservoir based on the determined water saturation ($S_w$) log and without a density log and a neutron log, wherein developing the reservoir comprises:

determining, based on the water saturation ($S_w$) log, a well location in the formation, the well location comprising a depth to minimize water production; and drilling a second well at the well location to form a second wellbore accessing the hydrocarbon reservoir.

\* \* \* \* \*